May 12, 1964
J. D. PLESSINGER
3,132,514
LEVEL INDICATOR APPARATUS
Filed July 28, 1960
2 Sheets-Sheet 1
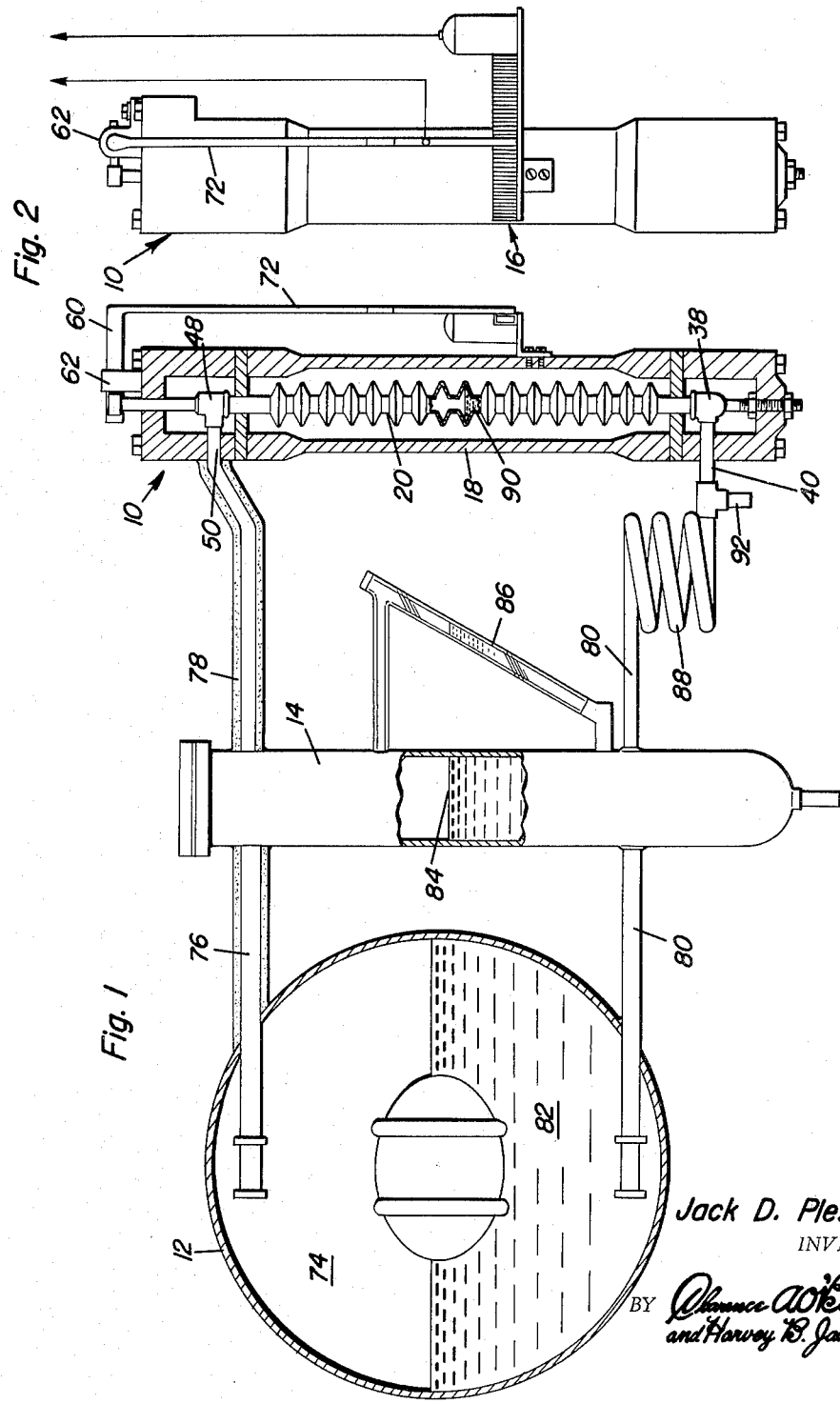
Jack D. Plessinger
INVENTOR.

May 12, 1964
J. D. PLESSINGER
3,132,514
LEVEL INDICATOR APPARATUS
Filed July 28, 1960
2 Sheets-Sheet 2
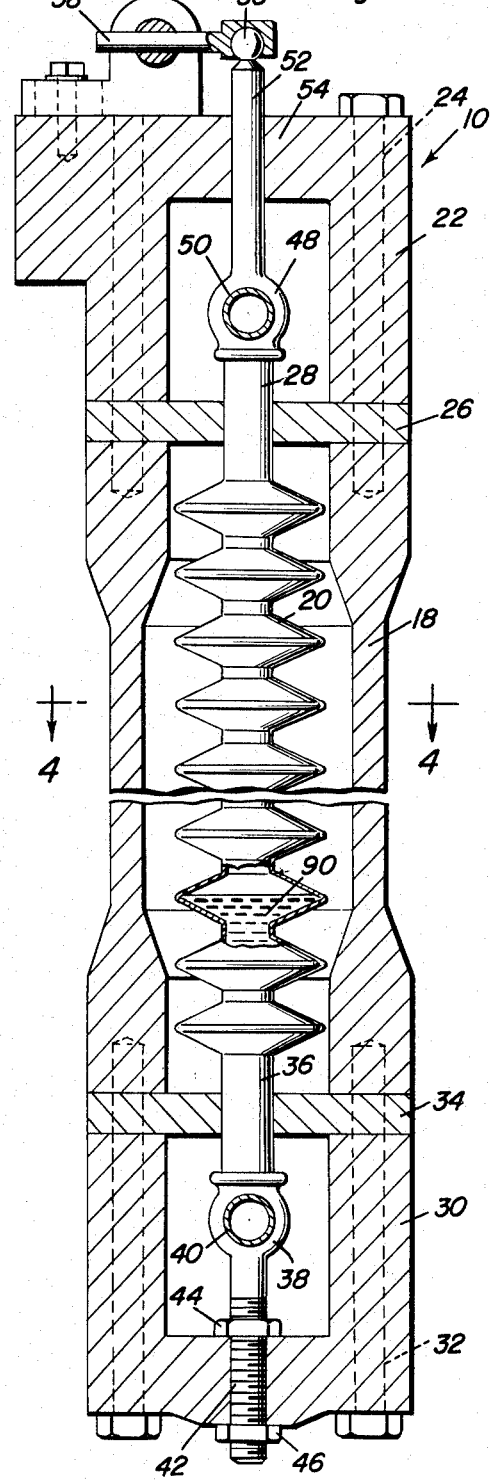
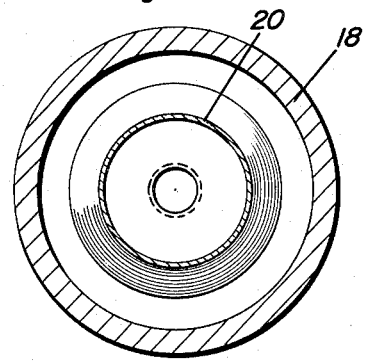
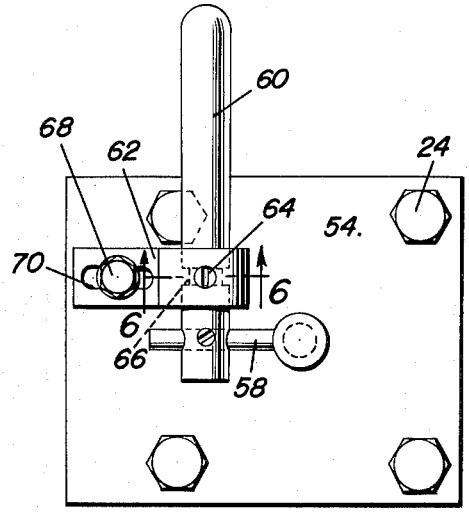
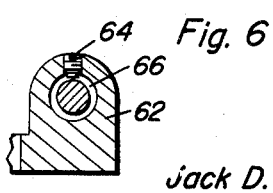
Jack D. Plessinger
INVENTOR.
BY *Clarence A. O'Brien*
*and Harvey B. Jackson*
Attorneys

United States Patent Office 3,132,514
Patented May 12, 1964

3,132,514
LEVEL INDICATOR APPARATUS
Jack D. Plessinger, 1147 17th St., Newport News, Va.
Filed July 28, 1960, Ser. No. 45,876
1 Claim. (Cl. 73—295)

This invention relates to novel and useful apparatus for indicating the liquid level within steam boilers or the like.

It is therefore a primary object of this invention to provide a liquid level indicating apparatus that is reliable in operation, rugged in construction, accurate and adjustable.

Another object of this invention is to provide a liquid level indicating apparatus which is especially useful in conjunction with various types of signal indicating mechanisms and recording mechanisms remotely located with respect to the boiler installation.

The novel level indicator made in accordance with this invention utilizes a thermal expansion tube element which is axially displaceable by variable amounts along its length because of variation in temperature of the fluid medium in a vertical direction along the expansion tube. Accordingly, the upper end of the expansion tube is connected to the steam within the boiler while the lower end of the expansion tube is connected to the water within the boiler. The high temperature of the steam therefore tends to expand the thermal expansion tube while a rise in the level of the water which also partially fills the thermal tube tends to collapse the expansion tube inasmuch as the water is at a lower temperature than that of the steam. Accordingly, as the water level in the thermal expansion tube increases the overall temperature gradient changes so as to collapse or shorten the tube. Conversely, a lowering of the water level within the thermal tube increases the extent of the steam therein at a higher temperature than that of the water to thereby expand or lengthen the tube. It will therefore be apparent that the total dimensional variation of the tube will reflect the volume of water within the steam boiler as a function of steam temperature and its volume relative to the water which water is connected to the thermal tube after passing through a cooler and rises to a level therein corresponding to the water volume in the boiler. The dimensional condition of the thermal tube therefore provides an instantaneous indication of the water level, said tube therefore being connected by means of a transmitting linkage to any suitable type of remote signal mechanism for either indicating the water level at a remote location and/or recording variations in water level.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a sectional schematic view of the liquid level indicator in combination with the boiler to which the indicator apparatus is applied;

FIGURE 2 is a front elevational view of the indicator apparatus itself;

FIGURE 3 is a sectional view through the indicator apparatus;

FIGURE 4 is a sectional view taken through a plane indicated by the section line 4—4 in FIGURE 3;

FIGURE 5 is a top plan view of the apparatus illustrated in FIGURE 3.

FIGURE 6 is a sectional view taken through a plane indicated by the section line 6—6 in FIGURE 5.

Referring to the drawing in detail, FIGURE 1 illustrates the thermal expansion indicator unit generally indicated by the reference numeral 10 operatively connected to a steam boiler 12. A water column tank 14 is interposed between the boiler 12 and the indicator unit 10. It will also be observed from both FIGURES 1 and 2 that the unit 10 has mounted thereon an electrical rheostat mechanism 16 by means of which the level indicator may transmit its information to a remote point. It will, of course, be appreciated that many different and suitable types of transmitting and recording mechanisms may be used in conjunction with the indicator apparatus to which this application relates.

Referring now to FIGURE 3 in particular it will be observed that the thermal expansion indicating unit 10 includes a central casing portion 18 within which an expansible type of thermal tube 20 is disposed. An upper head member 22 is secured to the top of the casing portion 18 by means of a plurality of bolts 24. A gasket member 26 is interposed between the head member 22 and the central casing member 18, the upper movable end 28 of the thermal expansion tube 20 extending through said gasket member 26. Connected to the lower end of the casing 18 is a lower end casing member 30 which is connected to the casing 18 by means of a plurality of bolts 32 with a gasket member 34 being interposed between the lower end casing member 30 and the casing 18. A lower anchored end portion 36 of the thermal expansion tube 20 therefore extends through the gasket member 34. The lower end portion 36 is therefore connected to a lower fitting 38 to which a liquid inlet tube 40 is connected. The fitting 38 and expansion tube 20 itself are therefore adjustably positioned within the casing member by means of a threaded shaft 42 threadedly engaged with the lower end casing member 30. An adjusting nut 44 and lock nut 46 are therefore provided for the purpose of adjustably positioning the thermal tube 20.

Connected to the upper end portion 28 of the thermal tube 20 is a fitting 48 to which the steam inlet tube 50 is connected. A plunger arm 52 is also connected to the fitting 58 and is slidably movable through the top wall 54 of the upper casing member 22 in response to expansion and collapse of the thermal tube 20.

It will be observed that the top of the plunger element 52 has a ball formation 56 for universal joint connection to an arm element 58. Referring now to FIGURE 5, it will therefore be observed that the arm 58 will be actuated by the plunger element 52 to oscillate an actuating member 60 connected to the arm 58. The actuating member 60 is accordingly rotatably mounted by means of an adjustable bracket member 62 as more clearly seen in FIGURE 6. The actuating member 60 is axially positioned in the bracket member 62 by means of a screw element 64 engageable within a groove 66 formed in the actuating member 60. The bracket member 62 also is adjustably mounted on the top wall 54 of the upper casing member 22 by means of a bolt 68 cooperating with a slot 70 within the bracket member 62. Accordingly, it will be appreciated that an adjustable connecting linkage is provided between the expansion tube actuated plunger element 52 and the actuating member 60. Referring therefore to FIGURES 1 and 2 it will be observed that the actuating member 60 includes a vertical depending arm 72 by means of which the level is indicated on a mechanism 16 from which the liquid level information may be transmitted to some remote location.

Referring now to FIGURE 1 it will be observed that the steam 74 partially filling the boiler 12 is transmitted through a conduit 76 into the inlet tube 50 connected to the upper fitting 48 of the expansion tube unit 10, said steam 74 and conduit 76 passing through the water column tank 14. An insulating sheath 78 is therefore wrapped around the tubular conduit 76 so that the thermal unit 10 may accurately reflect the temperature of the steam 74 within the boiler 12.

It will also be observed in FIGURE 1, that a tubular conduit 80 is connected to the boiler 12 and is in communication with the water 82 partially filling the boiler, said tubular conduit 80 passing through the water column tank 14 whereby the water level 84 within the water tank 14 responds to the level of the water in the boiler 12. The water level is also visible in a tube 86 connected to the water column tank 14 for such purpose. The water conduit 80 therefore continues beyond the water tank 14 and is connected to the inlet tube 40 for admission into the thermal tube 20 of the unit 10. A cooling coil 88 is provided in the conduit 80 for the purpose of controllably cooling the water 90 admitted into the thermal tube 20. Accordingly, a blow off 92 is also provided in the water conduit 80 as seen in FIGURE 1. It should be apparent from the foregoing, that the cooling coil 88 relates to one schematically illustrated method for controlling cooling or heat exchange with a liquid sample by tube 80 before it is applied to the expansion tube 20 for the purpose of restricting the influence of the liquid in the vapor generator to the volume is occupies as aforementioned, it being appreciated that variations in the temperature of the liquid as sampled by tube 80 and the ambient temperature of the surrounding air would otherwise effect expansion of the thermal expansion tube 20. Heat exchange apparatus for analogous but different regulatory purposes have heretofore been used such as that disclosed in Patent No. 2,931,224. Inasmuch as such heat exchange methods or apparatus do not per se form any part of the present invention, no details thereof are illustrated or described herein.

From the foregoing description of the apparatus, operation of the apparatus for indicating the level of the water 82 within the boiler 12 will become apparent. It will therefore be recognized that the water level within the expansion tube 20 will determine the extent and position of the thermal tube 20 independent of the water temperature variations which would adversely affect level indications, inasmuch as the volume of cooled water 90 occupying the space in the tube 20 below the steam will vary in accordance with the level of the water. The water temperature may therefore be controlled by means of the cooling coil 88 in order to vary the response of the thermal unit 10 or to vary its calibration. It will therefore be appreciated that the level indicator is operated in a novel manner in accordance with the temperature difference between the steam in the boiler and that of the water within the thermal tube at the controlled calibration temperature aforementioned, the influence of the water temperature varying with the water level or volume within the boiler to thereby position or displace the thermal tube for accurately measuring variations in the water level regardless of the variations in surrounding ambient temperature which would adversely affect the accuracy of indicators heretofore utilized.

As a result of the novel apparatus and manner employed to reflect the water level a more rugged, instantaneous and reliable indicator is made possible which is specially useful in conjunction with a mechanical and electrical connection to indicate and record the water level in a boiler at a remote location relative thereto.

The foregoing is considered as illustration only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

In a liquid level indicator and recorder for vapor generators, the combination with the vapor and liquid spaces of a vapor generator, of a thermal expansion tube having upper and lower ends, a fixed casing enclosing said expansion tube and fixedly mounting the lower end thereof while guidingly supporting the upper end for movement, insulated means for connecting said expansion tube at the upper end to the vapor space in the vapor generator above the liquid level therein, conduit means for operatively connecting the lower end of the expansion tube in fixedly adjusted position to the liquid space of the generator below the liquid level therein, and heat exchange means operatively connected to the conduit means and controllably cooling the liquid admitted into the expansion tube for controlling the temperature thereof in order to calibrate said movement of the expansion tube in accordance with volumetric variations in the liquid, said heat exchange means including a cooling coil adjacent to the expansion tube rigidly connecting the lower end thereof to the conduit means.

References Cited in the file of this patent

UNITED STATES PATENTS

| | | |
|---|---|---|
| 1,405,832 | Gentzel | Feb. 7, 1922 |
| 1,641,229 | Lind | Sept. 6, 1927 |
| 1,652,001 | Doering | Dec. 6, 1927 |
| 2,486,930 | De Giers et al. | Nov. 1, 1949 |
| 2,747,404 | VanHam | May 29, 1956 |
| 2,931,224 | Anderson | Apr. 5, 1960 |

FOREIGN PATENTS

| | | |
|---|---|---|
| 402,285 | Germany | Sept. 16, 1924 |
| 971,976 | France | Aug. 23, 1950 |